(12) United States Patent
Marze

(10) Patent No.: US 7,959,105 B2
(45) Date of Patent: Jun. 14, 2011

(54) AIRCRAFT PROVIDED WITH A SILENT SHROUDED ROTOR

(75) Inventor: Henri-James Marze, Rognac (FR)

(73) Assignee: Eurocopter (FR)

( * ) Notice: Subject to any disclaimer, the term of this patent is extended or adjusted under 35 U.S.C. 154(b) by 454 days.

(21) Appl. No.: 12/265,182

(22) Filed: Nov. 5, 2008

(65) Prior Publication Data

US 2009/0121075 A1    May 14, 2009

(30) Foreign Application Priority Data

Nov. 8, 2007    (FR) ...................................... 07 07834

(51) Int. Cl.
*B64C 27/82*    (2006.01)
(52) U.S. Cl. ................................... 244/17.19
(58) Field of Classification Search .................. 244/1 N, 244/17.15, 17.17, 17.21, 12.2, 51, 52, 78.1, 244/82, 17.19
See application file for complete search history.

(56) References Cited

U.S. PATENT DOCUMENTS

| | | | | |
|---|---|---|---|---|
| 2,383,038 A * | 8/1945 | Bossi | ......................... | 244/17.21 |
| 3,583,659 A * | 6/1971 | Lermusiaux | ............... | 244/17.19 |
| 4,200,252 A * | 4/1980 | Logan et al. | ............... | 244/17.19 |
| 5,108,044 A * | 4/1992 | Weiner et al. | ............... | 244/17.19 |
| 5,131,604 A * | 7/1992 | Yoerkie et al. | ............. | 244/17.19 |
| 5,150,857 A * | 9/1992 | Moffitt et al. | ................ | 244/12.2 |
| 5,209,430 A * | 5/1993 | Wilson et al. | .............. | 244/17.19 |
| 5,240,205 A * | 8/1993 | Allongue | .................... | 244/17.19 |
| 5,277,380 A * | 1/1994 | Cycon et al. | ................. | 244/12.2 |
| 5,588,618 A * | 12/1996 | Marze et al. | ............... | 244/17.19 |
| 5,727,381 A * | 3/1998 | Rogers | ............................ | 60/231 |
| 7,731,121 B2 * | 6/2010 | Smith et al. | ................ | 244/17.19 |

FOREIGN PATENT DOCUMENTS

| | | |
|---|---|---|
| FR | 2 719 550 | 11/1995 |
| GB | 910679 | 11/1962 |

OTHER PUBLICATIONS

French Search Report corresponding to FR0707834 filed Nov. 8, 2007.

* cited by examiner

*Primary Examiner* — Thomas Price
(74) *Attorney, Agent, or Firm* — Brooks Kushman P.C.

(57) ABSTRACT

An aircraft has a streamlined structure (10) pierced by an air flow duct (20) having an axis of symmetry (AX) contained in a plane of symmetry (P) perpendicular to a longitudinal axis (AL) of the aircraft, the aircraft possessing a shrouded rotor (1) having a plurality of blades (2) arranged in the air flow duct (20). The aircraft is also fitted with blower elements (40) suitable for propelling compressed air towards a first injection zone (44) opening out in a first front inject (22') of a first lip (22) of the periphery (21) of the duct (20) and towards a second injection zone (45) opening out in a second front portion (24') of a second lip (22) of the periphery (21) of the duct (20).

17 Claims, 2 Drawing Sheets

AIRCRAFT PROVIDED WITH A SILENT SHROUDED ROTOR

The present invention relates to an aircraft provided with a silent shrouded rotor, and more particularly to a helicopter with a shrouded tail rotor.

BACKGROUND OF THE INVENTION

A helicopter generally has a single main rotor driven mechanically by at least one turbine engine, the main rotor serving to provide the helicopter with lift and propulsion.

That type of helicopter is then provided with a tail rotor that performs an anti-torque function by exerting transverse thrust in order to compensate the torque created by rotation of the main rotor.

In addition, the tail rotor enables the pilot to control yaw and steering maneuvers of the helicopter by exerting transverse thrust that is positive or negative.

A non-shrouded tail rotor, referred to herein as a "conventional" tail rotor for convenience, is known that performs this function. Conventionally, a non-shrouded tail rotor is mounted on one side of the tail fin and at its top end, or on an end of the tail boom of the helicopter.

Such non-shrouded tail rotors are in widespread use. Nevertheless, it is also possible to implement a shrouded tail rotor, known under the trademark Fenestron®.

The shrouded tail rotor is then arranged in a duct formed through the bottom portion of the vertical fin of the helicopter tail, the longitudinal axis of the duct being substantially perpendicular to the vertical plane of symmetry of the helicopter.

Consequently, the streamlined structure of the vertical tail fin of the helicopter surrounds said duct and thus the tail rotor, which explains why it is referred to as a shrouded tail rotor. It should be observed that this streamlined structure is generally called a "shroud" by the person skilled in the art.

The streamlined structure then protects the shrouded tail rotor against impacts. Similarly, it increases safety for personnel on the ground by preventing such personnel being injured by the shrouded tail rotor.

In addition, from an acoustic point of view, a shrouded tail rotor constitutes significant progress compared with a tail rotor that is not shrouded.

The streamlined structure surrounding the duct containing the shrouded tail rotor prevents noise from escaping towards the front and towards the rear of the rotorcraft, whereas a non-shrouded tail rotor broadcasts noise in all directions.

Consequently, using a shrouded tail rotor reduces the sound nuisance of a helicopter.

Document FR 2 719 550 describes a shrouded tail rotor that is optimized from an acoustic point of view.

The shrouded tail rotor is arranged in an air flow duct having an axis extending transversely relative to the helicopter, with a flow-straightening stator being secured in the air flow duct upstream from the shrouded tail rotor.

That shrouded tail rotor has a plurality of blades that are distributed irregularly such that the angle between any two blades of the shrouded tail rotor is different from the angle between any two vanes of the stator.

Nevertheless, it is found in practice that a shrouded tail rotor continues to give rise to a non-negligible amount of noise, in particular when the helicopter is traveling at medium speed, above 80 knots, for example.

OBJECT AND SUMMARY OF THE INVENTION

An object of the present invention is thus to propose means enabling the noise generated by a shrouded rotor of an aircraft to be minimized, e.g. a shrouded tail rotor of a helicopter.

According to the invention, the aircraft has a streamlined structure pierced by an air flow duct having an axis of symmetry contained in a plane of symmetry that is perpendicular to a longitudinal axis of the aircraft, the aircraft having a shrouded rotor with a plurality of blades arranged in said air flow duct.

The periphery of said air flow duct, i.e. the circular peripheral wall of the duct, is provided in succession along its axis of symmetry with a first lip, with an intermediate portion, and then with a second lip, the first lip having a first front portion situated on the side of the duct that is closer to the front of the aircraft and having a first rear portion on the side of the duct that is closer to the rear end of the aircraft, the second lip being provided with a second front portion situated on the side of the duct that is closer to the front of the aircraft and with a second rear portion on the side of the duct that is closer to the rear end of the aircraft. The aircraft is also fitted with blower means for reducing the noise generated by the shrouded rotor, the blower means being suitable for propelling compressed air towards a first injection zone opening out into the first front portion of the first lip and towards a second injection zone opening out into the second front portion of the second lip.

When the aircraft is a helicopter, the shrouded rotor is constituted, for example, by the shrouded tail rotor disposed in an air flow duct passing through the streamlined structure of the vertical tail fin of the helicopter.

Surprisingly, it is found that the noise generated by the shrouded rotor, e.g. the shrouded tail rotor constituting the Fenestron® of a helicopter, is reduced considerably when the invention is implemented, in particular when the helicopter is traveling at a medium speed greater than 80 knots, for example, at which speed it is the noise generated by the shrouded rotor that is usually preponderant.

The Applicant has found that the noise generated in this speed range by conventional helicopters is caused by separation of the streams of air that enter the air flow duct.

When the helicopter is advancing, air entering the air flow duct turns through substantially ninety degrees.

At low speed, the air streams can turn without difficulty. The air streams then remain attached to the periphery of the air flow duct.

In contrast, the Applicant has found, surprisingly, that as from medium speeds of the order of 80 knots, the air streams start separating in the vicinity of the first and second front portions of the first and second lips, and that separation occurs in non-simultaneous manner. Each blade end then passes quickly from a stabilized flow to a separated zone that is full of dead fluid and this is very violent from an acoustic point of view.

When the helicopter is traveling at medium speed, the noise generated in this way is preponderant. Nevertheless, at high speed, the main rotor noise hides the noise generated by the shrouded tail rotor.

Since certification tests are performed solely at medium speed, the problem giving rise to the noise could be identified only by exercising particularly inventive activity.

By injecting compressed air into the first and/or second injection zones, in the flow direction of air flowing through the duct, the blower means fills the bubble of air created by the air streams separating, thereby enabling said streams to become reattached to the periphery of the duct.

Consequently, the blades of the rotor no longer pass from a stabilized flow to a separated zone filled with a dead fluid, so the shrouded tail rotor no longer gives rise to intense noise. A significant improvement is observed, with the noise generated by the tail rotor being reduced by at least five decibels.

Furthermore, it is advantageous for the blower means to propel the compressed air towards at least the first lip via the first injection zone when the shrouded rotor is generating a flow of air going from the first lip towards the second lip. In contrast, the blower means propels the compressed air towards at least the second lip via the second injection zone when the shrouded rotor is generating a flow of air going from the second lip towards the first lip.

More particularly, when the pitch of the blades lies between a predetermined maximum negative pitch and a predetermined minimum negative pitch, the shrouded rotor generates a flow of air from the first lip towards the second lip. Consequently, the blower means propels compressed air solely towards the first lip via the first injection zone.

Likewise, when the pitch of the blades lies between a predetermined minimum positive pitch and a predetermined maximum positive pitch, the shrouded rotor generates a flow of air from said second lip towards said first lip. The blower means then propels compressed air solely towards the second lip via the second injection zone.

It should be observed that if the pitch of the blades lies between the minimum negative pitch and the minimum positive pitch, then the blower means propels compressed air towards both the first and the second lips.

However, when the pitch of the blades is less than a predetermined maximum negative pitch, said blower means do not propel compressed air towards said first and second lips. Likewise, when the pitch of the blades is greater than a predetermined maximum pitch, the blower means do not propel compressed air towards said first and second lips.

These particularly advantageously technical characteristics enable the effectiveness of the blower means to be optimized.

The explanation for the advantages obtained by these characteristics is closely tied to the way the shrouded rotor operates, particularly if it is a shrouded tail rotor of a helicopter.

The shrouded tail rotor exerts transverse thrust in order to overcome the torque generated by the main rotor, or in order to cause the helicopter to turn, for example.

The shrouded tail rotor thus exerts thrust in a positive direction when the helicopter is in "traction" mode, i.e. when the pitch of its blades is positive. In contrast, the shrouded tail rotor exerts thrust in a negative direction, opposite to the positive direction, when the helicopter is in "reverse" mode, i.e. when the pitch of the blades of the tail rotor is negative.

Consequently, when the pitch of the blades is less than a maximum negative pitch, i.e. when the pitch lies in a range −90° to a maximum negative pitch, e.g. of −10°, then the tail rotor exerts a large amount of negative thrust. The air streams are sucked into the air flow duct at non-negligible speed, thereby enabling them to be attached to the periphery of said duct, in particular to its front periphery where it is closer to the front of the aircraft. It is then possible optionally to avoid using the blower means.

When the pilot increases the pitch of the blades, so that the pitch reaches a value lying between a predetermined negative maximum pitch and a predetermined negative minimum pitch, e.g. negative maximum pitch of −10° to a negative minimum pitch of −1°, the shrouded tail rotor does not generate sufficient suction to avoid the air streams separating and thus creating a bubble of dead fluid that generates noise.

When the helicopter is in "reverse" mode, air flows through the air duct going from the first lip towards the second lip. Consequently, the blower means feeds compressed air to the first injection zone in order to eliminate the bubble of dead fluid.

Thereafter, when the helicopter is traveling quickly, its vertical tail fin suffices to counter the torque from the main rotor.

When flying horizontally, the pilot therefore has no need to require a large amount of thrust from the tail rotor.

The pitch of the blades then lies between a predetermined negative minimum pitch and a predetermined positive minimum pitch, i.e. between a negative minimum pitch of −1° and a positive minimum pitch of +10°, for example.

Consequently, the blower means advantageously feed air to both the first and second injection zones in order to eliminate the bubble of dead fluid.

As before, in "traction" mode, between a positive minimum pitch and a positive maximum pitch, e.g. between a positive minimum pitch of +1° and a positive maximum pitch of +11°, the blower means feed compressed air to the first injection zone in order to eliminate the bubble of dead fluid.

Finally, beyond the maximum positive pitch, the blower means are not activated and they feed neither the first injection zone nor the second injection zone.

Furthermore, in order to optimize the distribution of compressed air, each injection zone optionally covers an angular field lying in the range 0 degrees to 180 degrees (boundaries not included), depending on the flying speed of the aircraft and also on its sideslip angle.

In a first configuration of the invention, at least one injection zone comprises a slot along the entire injection zone.

In a second configuration, at least one injection zone comprises a succession of orifices.

In order to perform its function, the blower means may include an air intake feeding air for blowing to a valve suitable for causing the air for blowing to reach the first and second injection zones respectively via first and second feed channels.

The valve, e.g. a three-port valve, thus serves to feed air for blowing to the first and second injection zones, individually or together, depending on requirements. Similarly, the valve can cut off access to both of the first and second injection zones.

In a first embodiment, the air intake is a dynamic air intake picking up air for blowing by virtue of the aircraft moving, and the valve is connected to the dynamic air intake via a delivery pipe.

That installation is very simple to make at low cost, which presents an advantage that is not negligible.

The picked-up air for blowing can be pressurized by acting on the diameter of the delivery pipe or indeed by arranging a compressor in the delivery pipe.

In a second embodiment, the air intake is a static air intake, and the valve is connected to said static air intake by a delivery pipe that includes a compressor enabling the static air intake to suck in air for blowing.

This embodiment presents the advantage of being capable of being turned off on command. By stopping the compressor, it is ensured that the air intake ceases to pick up air for blowing.

Whatever the embodiment, the compressor is either electrically-driven, comprising an ordinary pump for example, or else it is mechanically-driven.

If it is mechanically-driven, the compressor may be driven by the transmission shaft used for rotating the hub of the shrouded rotor, e.g. via a belt. Likewise, the compressor may be provided with fins placed on said transmission shaft in order to direct the air for blowing coming from the air intake towards the valve.

The pitch of the blades of a shrouded tail rotor is conventionally adjusted by the pilot operating pedals connected by transmission means to a servo-control that acts on a pitch-change spider suitable for modifying the pitch of the blades. Advantageously, the blower means are then controlled by the transmission means connecting the pedals to the servo-control.

It is possible to determine whether the blower means should send compressed air towards the first and second front portions of the first and second lips of the air flow duct as a function of the pitch of the blades of the shrouded rotor. The transmission means used for adjusting the pitch of the blades when moved by the pedals thus constitute excellent means for controlling the position of the valve of the blower means.

In a second variant, the aircraft is provided both with a reference pressure sensor disposed in a side face of the streamlined structure and with a detection pressure sensor arranged at the periphery of the duct between the first and second air injection zones, and the aircraft includes control means receiving first and second signals respectively from the reference pressure sensor and the detection pressure sensor so as to be able to determine whether the blower means need to be activated.

BRIEF DESCRIPTION OF THE DRAWINGS

The invention and its advantages appear in greater detail from the following description of embodiments given by way of illustration with reference to the accompanying figures, in which.

MORE DETAILED DESCRIPTION

Elements shown in more than one of the figures are given the same references in each of them.

Three mutually orthogonal directions referenced X, Y, and Z are shown in the figures.

The X direction is said to be longitudinal insofar as it extends along the length of the aircraft.

The Y direction is said to be transverse.

Finally, the Z direction is the elevation direction and corresponds to the height dimensions of the structures described.

Thus, the (X,Y) plane defined by the longitudinal and transverse directions X and Y is referred to as the horizontal plane since this plane is substantially perpendicular to gravity.

In contrast, the (Y,Z) plane defined by the transverse and elevation directions Y and Z is referred to as the transverse plane, for convenience. The transverse (Y,Z) plane is perpendicular to the longitudinal direction X.

Figure 1:
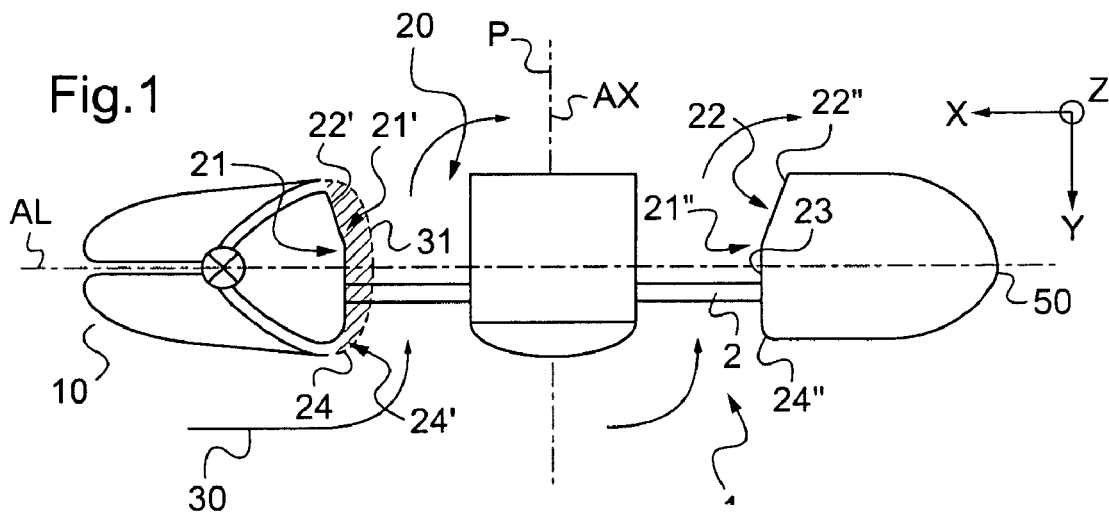
FIG. 1 is a horizontal section showing the phenomenon giving rise to the noise generated by the shrouded rotor.

FIG. 1 is a horizontal section explaining the phenomenon that gives rise to the noise generated by the shrouded rotor 1. More precisely, the shrouded rotor 1 is a shrouded tail rotor of a helicopter of the Fenestron® type.

Consequently, this aircraft has a streamlined structure 10, i.e. a vertical fin, pierced in its bottom portion by an air flow duct 20 having an axis of symmetry AX that is contained in a plane of symmetry P perpendicular to a longitudinal axis AL of the helicopter. The plane of symmetry P is then parallel to the transverse (Y,Z) plane, while the longitudinal axis AL coincides with the longitudinal direction X.

The shrouded rotor 1, having a plurality of blades 2 is then arranged in the air flow duct 20.

It should be observed that this air flow duct 20 comprises in succession along its axis of symmetry AX, and at its periphery 21, a first lip 22 forming a diverging cone, an intermediate portion 23, and then a second lip 24 that is rounded.

More precisely, the periphery 21 of the air flow duct 20 comprises a front periphery 21' on its side closest to the front of the helicopter, and a rear periphery 21" on its side closest to the rear end 50 of the helicopter. The first lip 22 then possesses a first front portion 22' situated beside the front periphery 21' of the duct that is closer to the front of the helicopter and a first rear portion 22" situated beside the rear periphery 21" of the duct that is closer to the rear end 50 of the helicopter. Similarly, the second lip 24 is provided with a second front portion 24' situated beside the front periphery 21' of the duct closer to the front of the helicopter, and a second rear portion 24" situated beside the rear periphery 21" of the duct closer to the rear end of the helicopter.

When the helicopter is in forward flight, it moves along the longitudinal direction X, and the air flow duct 20 has air streams 30 passing therethrough.

Nevertheless, depending on the forward speed and on the pitch of the blade 2, it is possible that these air streams 30 do not attach to the front periphery 21' of the air flow duct 20.

Such separation of the air streams causes a bubble 31 to be formed that is filled with dead fluid, and that gives rise to the excessive noise produced by the shrouded rotor 1.

Figure 2:
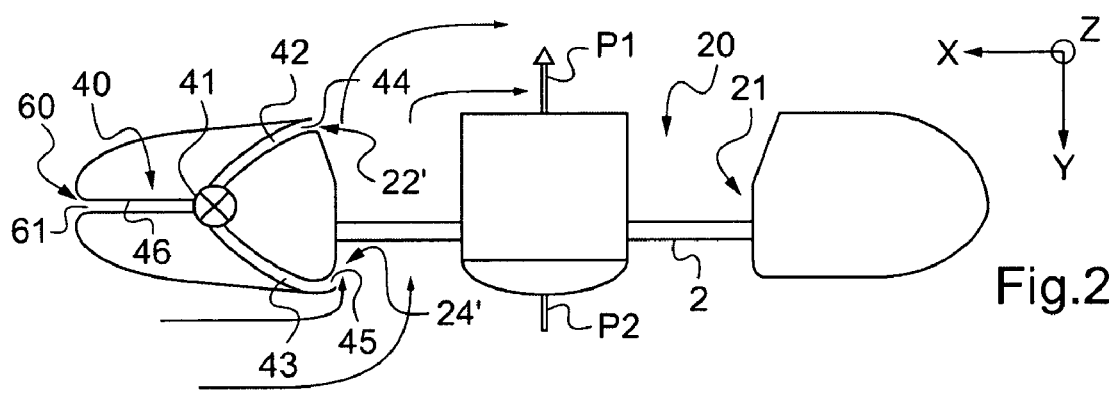
FIG. 2 is a diagrammatic horizontal section explaining the operation of the invention in a first embodiment.

With reference to FIG. 2, and regardless of the embodiment, the invention includes blower means 40.

The blower means 40 convey compressed air for blowing that is taken from an air intake 60 to a first injection zone 44 via first channel 42, said first injection zone opening out in the first front portion 22' of the first lip 22. Likewise, the blower means 40 convey compressed air for blowing taken via the air intake 60 to a second injection zone 45 by means of a second channel 43, the second injection zone 45 opening out into the second front portion 24' of the second lip 24.

It should be observed that the blower means 40 are provided with a valve 41 for feeding the first injection zone 44, or the second injection zone 45, or indeed both the first and second injection zones 44 and 45 simultaneously.

In addition, it is possible to envisage that the valve feeds neither the first injection zone 44 nor the second injection zone 45. In order to avoid potential excess pressure, the valve may also exhaust the air for blowing as picked up by the air intake, to a zone for ejecting air to the outside.

Consequently, when the pitch of the blades 2 lies between a maximum negative pitch and a minimum negative pitch, the shrouded rotor 1 exerts "negative" thrust in the direction of arrow P1. The shrouded rotor 1 generates a flow of air from the first lip towards the second lip and the valve 41 of the blower means 40 deliver air for blowing to the first injection zone 44.

The injected air for blowing fills the bubble of dead fluid, thereby enabling air streams to attach to the front periphery 21' of the air flow duct 20. Eliminating this bubble of dead fluid greatly reduces the noise generated by the shrouded rotor 1.

When the pitch of the blades 2 lies between a minimum negative pitch and a minimum positive pitch, then the valve 41 of the blower means 40 sends air for blowing both to the first injection zone 44 and to the second injection zone 45.

In contrast, when the pitch of the blades 2 lies between a minimum positive pitch and a maximum positive pitch, the shrouded rotor 1 exerts "positive" thrust in the direction of arrow P2. The shrouded rotor 1 generates a flow of air from the second lip towards the first lip and the valve 41 of the blower means 40 delivers air for blowing to the second injection zone 45.

Finally, when the pitch of the blades is less than the maximum negative pitch or greater than the maximum positive pitch, then the valve 41 does not send air for blowing to either the first injection zone or the second injection zone, but possibly sends air to an exhaust zone that is arranged to avoid disturbing the operation of the shrouded rotor.

In the first embodiment shown in FIG. 2, the air intake 60 comprises a dynamic air intake 61 connected to the valve 41 via a delivery pipe 46.

While the helicopter is moving, air for blowing penetrates naturally into the dynamic air intake and therefore feeds the valve 41 and then the first and second injection zones 44 and 45.

In addition, since the diameter of the delivery pipe is smaller than the diameter of the dynamic air intake, the air for blowing is compressed on penetrating into the delivery pipe.

It should be observed that it is possible, optionally, to arrange a compressor in the delivery pipe.

Depending on the variant implemented, the compressor could be an electrically-driven compressor or a mechanically-driven compressor.

Figure 3:
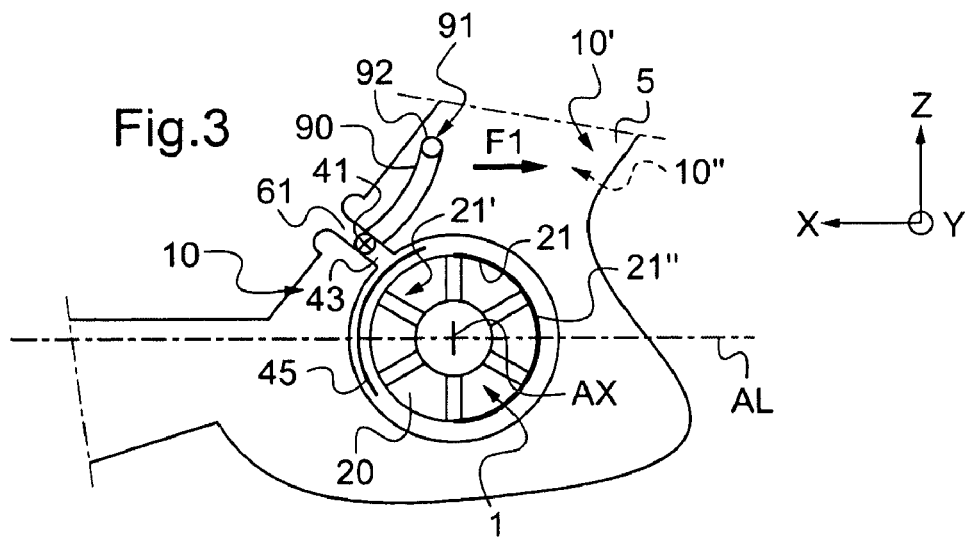
FIG. 3 is a vertical section showing the first embodiment of the invention.

FIG. 3 is a vertical section through the vertical tail fin 5 of the aircraft of the invention, a helicopter.

The shrouded rotor 1 is arranged in an air flow duct 20 formed in the bottom portion of the streamlined structure 10 of the vertical tail fin 5, the axis of symmetry AX of the air flow duct 20 being contained in a plane of symmetry P perpendicular to a longitudinal axis AL of the helicopter.

In the first embodiment, the blower means comprise a dynamic air intake feeding a valve 41 with air for blowing while the helicopter is moving.

This air for blowing is then directed, as required, by the valve 41 to first and second injection zones 44 and 45 via respective first and second channels 42 and 43.

The air for blowing then enables the air streams passing through the air flow duct 20 to attach to the periphery 21 of the air flow duct 20, in particular in the vicinity of its front periphery 21' extending between the first and second injection zones 44 and 45.

In order to optimize the installation, whatever the embodiment, each injection zone 44, 45 describes an angular field extending between 0° and 180° (boundaries not included), these injection zones 44 and 45 nevertheless not being in contact with the downstream periphery 21' drawn with a bold line in FIG. 3.

Furthermore, each injection zone includes at least one orifice opening out via a lip of the air flow duct 20, e.g. a continuous slot or a succession of orifices.

Finally, it should not be forgotten that it is possible for the valve to feed neither the first injection zone 42 nor the second injection zone 43. In order to avoid potential excess pressure when neither of the first and second channels 42 and 43 is being fed, the valve 41 exhausts the air for blowing as picked up by the air intake to an ejection zone 91 that is open to the outside.

More precisely, the valve 41 then directs the air for blowing that has been picked up to an ejection orifice 92 via an ejection channel 90. The air flow duct lies in the bottom portion of the streamlined structure 10 while the ejection orifice is arranged in one of the side faces 10' of the top portion of this streamlined structure 10. The air for blowing then escapes in the direction of arrow F1 and does not disturb the operation of the shrouded rotor.

It is optionally possible to provide first and second ejection orifices formed on each of the side faces 10' and 10" of the streamlined structure 10, the first and second ejection orifices being connected to the valve 41 via respective first and second ejection channels.

Thereafter, the valve 14 directs the air for blowing to be ejected via the ejection orifice, thereby enabling the ejection of the air for blowing to be oriented laterally in the same direction as the flow of air passing through the air flow duct. As a result the thrust exerted by the shrouded rotor is reinforced with the help of thrust generated by the ejected air for blowing.

Figure 4:
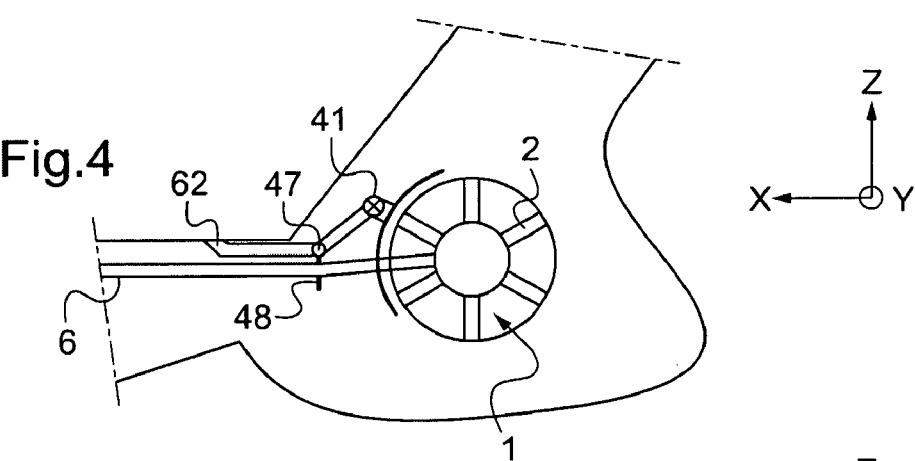
FIG. 4 is a vertical section showing the second embodiment of the invention.

FIG. 4 is a diagrammatic vertical section showing a second embodiment.

Unlike the first embodiment, the air intake comprises a static air intake 62 opening out in the tail boom of the helicopter. Since this air intake is static, the blower means must necessarily have a compressor 47 connected to the static air intake 62, the compressor 47 enabling the blower means to suck in air for blowing via the static air intake 62.

The compressor is then arranged in the delivery pipe connecting the static air intake of the valve 41 of the blower means.

The compressor 47 may be electrically-driven, or as shown in FIG. 4, it may be mechanically-driven. The variant shown comprises a compressor driven by a belt 48, itself driven by a power transmission shaft 6, the power transmission shaft 6 enabling an engine (not shown) to rotate the blades 2 of the shrouded rotor 1.

In addition, the mechanical compressor is provided with clutch means enabling the rotary elements of the compressor 47 to be disconnected from the belt 48. Thus, it is possible to turn off the compressor and thus the blower means at will.

Furthermore, depending on the situation, the valve 41 of the blower means puts the first and second channels into communication with the delivery pipe.

Figure 5:
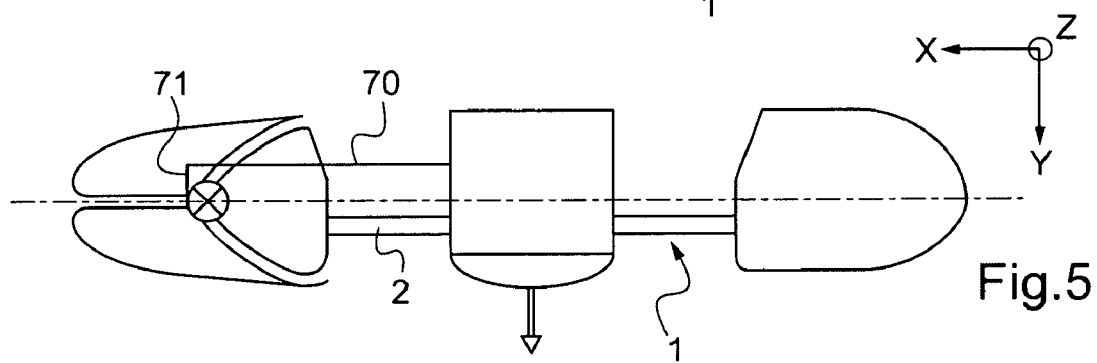
FIG. 5 is a horizontal section showing blower means controlled by a pitch control rod.

In a first variant shown diagrammatically in FIG. 5, in order to determine the position of the valve 41, the blower means are controlled by transmission means 70.

More precisely, the pilot controls the pitch of the blades and operates pedals by foot. The pedals then cause the transmission means 70 to move so as to operate a servo-control suitable for modifying said blade pitch via a pitch-change spider.

Thereafter, the movement of the transmission means 70, e.g. in translation along the longitudinal direction X, leads to movement of the valve 41, such as turning about its axis of symmetry. Thus, the transmission means 70, e.g. a transmission shaft, control the blower means, i.e. the valve 41.

Advantageously, in order to be able to transmit its movements to the valve 41 of the blower means, the transmission means are connected to said valve 41 via a connection 71.

It has been shown that the pitch of the blades 2 of the rotor can give an indication as to which of the channels needs to be fed with air for blowing.

Thus, the transmission means 70 used by the pilot for modifying the pitch of the blades 2 of the shrouded tail rotor is useful in controlling the blower means, and more particularly the valve 41 of the blower means.

The advantage of this first variant of the embodiments of the invention lies in particular in its simplicity, this variant being purely mechanical. The valve of the blower means is controlled by mechanical control means, i.e. the transmission means 70 for controlling the pitch of the blades of the shrouded rotor.

Furthermore, using an existing mechanical element significantly limits the extra weight generated by the blower means, and that is not negligible.

Figure 6:
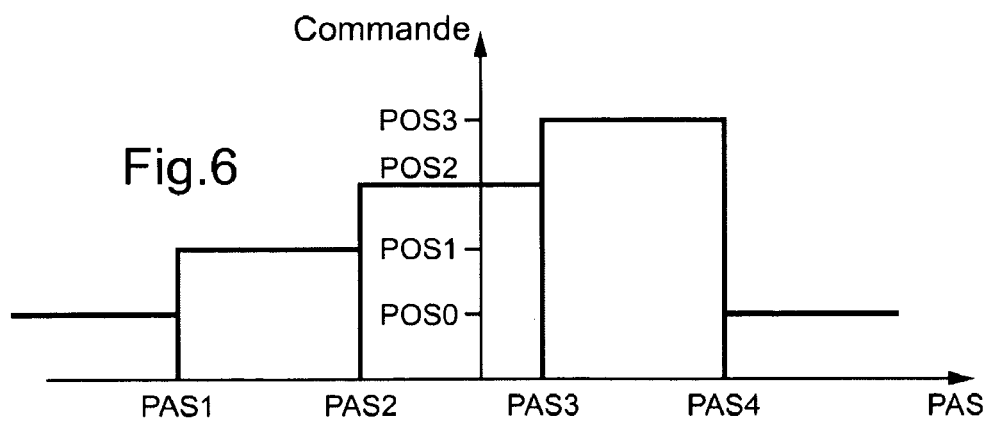
FIG. 6 is a diagram for explaining the operation of a variant of the blower means.

FIG. 6 is a diagram in which the pitch of the blades of the shrouded rotor is plotted along the abscissa and the command applied to the valve 41 is plotted up the ordinate, showing how this first variant operates.

When the transmission means 70 cause the blade to have a pitch that is less than a maximum negative pitch PITCH1, the transmission means 70 place the valve 41 in a closed position POS0 in which it feeds neither the first injection zone nor the second injection zone. In the closed position, the valve 41 optionally exhausts the air for blowing via an ejection channel 90 to the outside of the streamlined structure in a zone that is not liable to disturb the shrouded rotor.

Similarly, when the transmission means are moved by the pilot acting on the pedals to cause the blades to take on a pitch lying between a maximum negative pitch PITCH1 and a minimum negative pitch PITCH2, the transmission means 70 place the valve 41 in a first open position POS1, the valve then feeding the first injection zone after turning to pass from the closed position POS0 to the first open position POS1, for example.

When the transmission means cause the pitch of the blades to lie between a negative minimum pitch PITCH2 and a positive minimum pitch PITCH3, the transmission means 70 place the valve 41 in a second open position POS2, with the valve then feeding both the first and the second injection zones.

Furthermore, when the transmission means cause the pitch of the blades to lie between a minimum positive pitch PITCH3 and a maximum positive pitch PITCH4, the transmission means 70 place the valve 41 in a third open position POS3, the valve then feeding only the second injection zone.

Finally, when the transmission means cause the pitch of the blades to be greater than the maximum positive pitch PITCH4, the transmission means 70 place the valve 41 once more in a closed position POS0.

Figure 7:
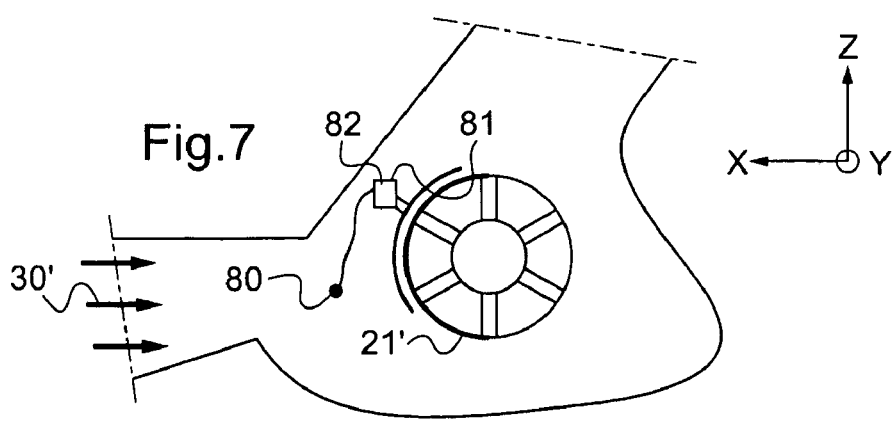
FIG. 7 is a vertical section showing blower means controlled by dedicated control means.

In a second variant shown in FIG. 7, the aircraft includes firstly a reference pressure sensor 80 disposed on a side face of the streamlined structure 10 around the air flow duct 20, and secondly a detection pressure sensor 81 disposed on the intermediate portion 23 of the front periphery 21' of the air flow duct 20.

More precisely, the detection pressure sensor is arranged between the first and second zones for injecting air for blowing.

These reference and detection pressure sensors 80 and 81 deliver respective first and second signals to control means 82, the first signal being representative of a reference pressure measured by the reference pressure sensor 80, while the second signal is representative of a detection pressure measured by the detection pressure sensor 81.

It should be observed that the reference pressure is a good indicator given the way the reference pressure sensor 80 is arranged relative to the incident air 30', with the movement towards the shrouded rotor of this incident air 30' being represented by arrows F2.

Variation in the pressure difference between the reference pressure and the detection pressure then amounts to indicating variation in the detection pressure.

Consequently, depending on said pressure difference between the reference pressure and the detection pressure, the control means 82 cause the valve 41 to take up a determined position, i.e. the closed position, the first open position, the second open position, or indeed the third open position.

Naturally, the present invention can be subjected to numerous variations concerning its implementation. Although several embodiments are described above, it will readily be understood that it is not conceivable to identify exhaustively all possible embodiments. It is naturally possible to replace any of the means described by equivalent means without going beyond the ambit of the invention.

What is claimed is:

1. An aircraft having a streamlined structure (10) pierced by an air flow duct (20) having an axis of symmetry (AX) contained in a plane of symmetry (P) perpendicular to a longitudinal axis (AL) of said aircraft, the aircraft possessing a shrouded rotor (1) having a plurality of blades (2) arranged in said air flow duct (20), wherein the periphery (21) of said air flow duct (20) is provided in succession along said axis of symmetry (AX) with a first lip (22), an intermediate portion (23), and then a second lip (24), said first lip (22) having a first front portion (22') situated at the side of the duct that is closer to the front of the aircraft, and having a first rear portion (22") situated at the side of the duct that is closer to the rear end (50) of the aircraft, said second lip (24) being provided with a second front portion (24') situated at the side of the duct that is closer to the front of the aircraft and with a second rear portion (24") situated at the side of the duct that is closer to the rear end (50) of the aircraft, and said aircraft is fitted with blower means (40) for reducing the noise generated by the shrouded rotor and suitable for propelling compressed air towards a first injection zone (44) opening out into said first front portion (22'), and to a second injection zone (45) opening out to said second front portion (24').

2. An aircraft according to claim 1, wherein said aircraft is a helicopter and said shrouded rotor is a shrouded tail rotor placed in an air flow duct (20) passing through a streamlined structure (10) of a vertical fin (5) of the helicopter.

3. An aircraft according to claim 1, wherein said blower means (40) propels compressed air towards at least said first lip (22) via said first injection zone (44) when said shrouded rotor generates a flow of air from said first lip (22) towards said second lip (24), the blower means (40) propelling the compressed air towards at least the second lip (24) via the second injection zone (45) when the shrouded rotor generates a flow of air going from the second lip (24) towards the first lip (22).

4. An aircraft according to claim 1, wherein when the pitch of the blades (2) lies between a predetermined maximum negative pitch (PITCH1) and a predetermined minimum negative pitch (PITCH2), said blower means propels compressed air solely towards said first lip (22) via said first injection zone (44), whereas said blower means propel compressed solely towards said second lip (24) via said second injection zone (45) when the pitch of the blades lies between a predetermined minimum positive pitch (PITCH3) and a predetermined maximum positive pitch (PITCH4).

5. An aircraft according to claim 1, wherein when the pitch of the blades (2) is less than a predetermined maximum negative pitch (PITCH1), said blower means does not propel compressed air to either of said first and second lips (22, 24).

6. An aircraft according to claim 1, wherein when the pitch of the blades is greater than a predetermined maximum positive pitch (PITCH4), said blower means (40) does not propel compressed air towards either the first or the second lips (22, 24).

7. An aircraft according to claim 1, wherein each injection zone (44, 45) occupies an angular field lying in the range 0° to 180°, boundary values not included.

8. An aircraft according to claim 1, wherein at least one injection zone (44, 45) comprises a slot.

9. An aircraft according to claim 1, wherein at least one injection zone (44, 45) comprises a succession of orifices.

10. An aircraft according to claim 1, wherein said blower means comprises an air intake (60) feeding air for blowing to a valve (41) suitable for causing said air for blowing to reach the first and second injection zones (44, 45) respectively via first and second feed channels (42, 43).

11. An aircraft according to claim 10, wherein said air intake (60) is a dynamic air intake (61) picking up said air for blowing by virtue of the movement of said aircraft, said valve (41) being connected to said dynamic air intake (61) via a delivery pipe (46).

12. An aircraft according to claim 11, wherein a compressor is arranged in said delivery pipe (46) in order to pressurize the air for blowing.

13. An aircraft according to claim 12, wherein said compressor (47) is electrically-driven.

14. An aircraft according to claim 12, wherein said compressor (46) is mechanically-driven.

15. An aircraft according to claim 10, wherein said air intake (60) is a static air intake (62), and said valve (41) is connected to said static air intake (62) via a delivery pipe (46) provided with a compressor (47) enabling said static air intake (62) to suck in said air for blowing.

16. An aircraft according to claim 1, wherein the pitch of the blades (2) of a shrouded rotor (1) is adjusted by a pilot working pedals connected via transmission means (70) to a servo-control that acts on a pitch-change spider suitable for modifying said pitch of the blades, the blower means being controlled by said transmission means (70).

17. An aircraft according to claim 1, wherein said aircraft is provided firstly with a reference pressure sensor (80) placed in a side face of said streamlined structure (10), and secondly with a detection pressure sensor (81) arranged at the periphery (21) of said duct (20) between the first and second air injection zones (44, 45), and said aircraft includes control means (82) receiving first and second signals respectively from the reference and detection pressure sensors (80 and 81) in order to determine whether the blower means (40) needs to be activated.

* * * * *